United States Patent [19]

Ogawa et al.

[11] 4,008,954

[45] Feb. 22, 1977

[54] DEVICE FOR EXTINGUISHING UNNECESSARY ELECTROSTATIC CHARGE IN ELECTROPHOTOGRAPHIC COPIER

[75] Inventors: Masaya Ogawa, Sakai; Yuji Enoguchi, Osaka; Hidetoshi Kawabata, Tondabayashi; Takaji Kurita, Kawachinagano; Susumu Tanaka, Sakai; Takao Fujiwara, Sakai; Hiroshi Murasaki, Sakai; Kenichi Wada, Sakai, all of Japan

[73] Assignee: Minolta Camera Kabushiki Kaisha, Osaka, Japan

[22] Filed: June 9, 1975

[21] Appl. No.: 584,893

[30] Foreign Application Priority Data

July 15, 1974 Japan ........................ 49-83865[U]

[52] U.S. Cl. .................................... 355/1; 355/3 R; 355/8

[51] Int. Cl.$^2$ .................. G03B 27/00; G03G 15/00

[58] Field of Search ................. 355/1, 3 R, 7, 8, 71

[56] References Cited

UNITED STATES PATENTS

| | | | |
|---|---|---|---|
| 3,724,942 | 4/1973 | Gibson et al. ..................... | 355/3 R |
| 3,799,666 | 3/1974 | Fukushima et al. ................... | 355/7 |

OTHER PUBLICATIONS

IBM Tech. Disclosure Bull.; vol. 16, No. 4, pp. 1262–1263; Sept. 1973; Bellamy, et al.

*Primary Examiner*—L. T. Hix
*Assistant Examiner*—J. A. LaBarre
*Attorney, Agent, or Firm*—Wenderoth, Lind & Ponack

[57] ABSTRACT

In an electrophotographic copying machine having a transparent support for support thereon the original to be copied, an illumination device for illuminating the original on the transparent support and a photoreceptor surface adapted to be driven past charging, exposure, developing, transfer and cleaning stations, a discharging device for extinguishing unnecessary electrostatic charge on the photoreceptor surface which is formed at an area between each two adjacent areas to be optically exposed to the incoming light, which discharging device has at least one light guide having one end situated adjacent an intercepting mechanism and the other end situated in the vicinity of the photoreceptor surface. The intercepting mechanism is brought into operation to intercept passage of discharging light towards the photoreceptor surface.

10 Claims, 6 Drawing Figures

DEVICE FOR EXTINGUISHING UNNECESSARY ELECTROSTATIC CHARGE IN ELECTROPHOTOGRAPHIC COPIER

BACKGROUND OF THE INVENTION

The present invention generally relates to an electrophotographic copying machine and, more particularly, to an electrophotographic copying machine which has a discharging device for dissipating or extinguishing unnecessary electrostatic charge imparted to the photoreceptor surface between each two adjacent areas to be optically exposed.

DESCRIPTION OF THE PRIOR ART

In most electrophotographic copying machine employing a photoelectrostatic recording process such as xerography, it is well known that a powder image is formed at a developing station on a portion of a photoreceptor surface which has previously been exposed at an exposure or imaging station to the incoming light, carrying an optical image of the original or document to be copied, to dissipate the electrostatic charge imparted uniformly over the photoreceptor surface. The photoreptor surface includes a photoconductive layer or light receiving layer on a conductive backing and formed in the shape of either a drum or an endless belt, which is adapted to rotate to sequentially pass a plurality of known processing stations including charging, exposure or imaging, developing, transfer and cleaning stations.

It is also known that, where the circumference of the photoreceptor surface is greater than the greatest possible length of the original or document to be copied which the transparent support structure of the copying machine for the support of said original or document can accommodate, the same optical image is projected at the exposure or imaging station on two or more consecutive portions of the photoreceptor surface before the photoreceptor surface finishes its complete rotation. In such case, prior to the photoreceptor surface entering the exposure of imaging station, an electrostatic charger disposed at the charging station applies an electrostatic charge uniformly all over the photoreceptor surface and, therefore, even after the electrostatic charge on portions of the photoreceptor surface, which have successively been exposed to the incoming light, has been dissipated to form latent images all in the configuration of the image of the original or document to be copied, an electrostatic remains on portions of the photoreceptor surface between each two adjacent exposed portions. This often provides a serious problem.

In other words, even though the residual electrostatic charge has been completely extinguished prior to the photoreceptor surface entering the charging station in readiness for the next cycle of copying operation, the electrostatic charge on those portions of the photoreceptor surface between each two adjacent exposed portions will, during said next cycle of copying operation, attract some of the developing material applied on said exposed portions to form the powder images at the developing station. When the photoreceptor surface carrying the powder images thereon subsequently enters the transfer station at which the powder images are successively transferred to respective webs of recording mediums, for example, papers, the developing material which has unnecessarily adhered to the unexposed portions of the photoreceptor is also transferred to the webs of recording mediums, thereby spoiling the reproduced recording mediums and, particularly, respective end portions of the recording mediums. This is not the only disadvantage. Other disadvantages and inconveniences are that the developing material is unnecessarily consumed, a cleaning medium provided in the cleaner unit at the cleaning station tends to readily be exhausted or wasted, the photoreceptor surface tends to readily be deteriorated and so on.

Moreover, where the residual developing material is not completely removed from the photoreceptor surface even after the latter has passed the cleaning station, the residual developing material is often fused to form a film on the photoreceptor surface by the influence of heat evolved, for example, by the eraser lamp, the electrostatic charger, the transfer charger and/or the temperature within the machine housing. This phenomenon is generally referred to as a filming on the photoreceptor surface and often accelerates deterioration of the photoreceptor surface.

In order to avoid the foregoing disadvantages and inconveniences, a discharging device has been developed for dissipating or extinguishing unnecessary electrostatic charge imparted to the photoreceptor surface between each two adjacent areas to be optically exposed. One example of this discharging device is disclosed and described in the U.S. Pat. No. 3,778,148, patented on Dec. 11, 1973. In the discharging device according to the aforesaid U.S. Patent, an erasing lamp disposed at the erasing station at which the residual electrostatic charge is removed by illuminating the photoreceptor surface is utilized in association with a shutter mechanism including a pivotably supported shutter for selectively interrupting and admitting passage of rays of light from the erasing lamp towards an exposure slit through which an optical image of the original or document to be copied is projected onto the photoreceptor surface. More specifically, the shutter member is pivoted to an open position, that is, held in position to permit the passage of light when a portion of the photoreceptor surface, which need not be exposed and, hence, no image is projected thereon, is passing the exposure slit. On the other hand, the shutter member is returned to a closed position, that is, held in position to interrupt the passage of light during exposure of the photoreceptor surface to the image for a length of time corresponding to the length of the recording medium on which the image is to be reproduced.

For operating the shutter member, in the manner described above, a solenoid unit having a solenoid armature pivotally connected to the shutter member is used, which solenoid unit is adapted to be energized and deenergized respectively for closing and opening the shutter member in response to passage of the opposite ends of the recording paper through a paper feed path towards the transfer station.

The conventional discharging device referred to above is very complicated and bulky in view of the fact the solenoid unit and its associated operating parts, a mirror arrangement for reflecting the rays of light from the erasing lamp towards the shutter members and, hence, the exposure slit and necessary support structures for the solenoid unit and the mirror arrangement are required. Moreover, during the manufacture of the copying machine having the discharging device, installation of the discharging device, which is complicated and bulky in structure, cannot be carried out without difficulty in view of the limited space available as the necessary operating elements of the copying machine are crowded around the photoreceptor surface.

Furthermore, the discharging device disclosed and described in the aforesaid U.S. Patent can only be used in an electrophotographic copying machine having a slit exposure system wherein the optical image of the original or document to be copied is projected onto the photoreceptor surface through an exposure slit.

Apart from the discharging device of the aforesaid U.S. Patent, the use of another erasing lamp exclusively for extinguishing the unnecessary electrostatic charge referred to above can be contemplated. In this case, the erasing lamp has to be selectively turned on and off in a similar manner to the above described shutter member is selectively pivoted between the open and closed positions. Where the discharging device comprises the erasing lamp now under discussion, since it requires some time for the erasing lamp to attain the intensity of light required for extinguishing the unnecessary electrostatic charge even after said erasing lamp has been turned on, substantially the first half of that portion, i.e., an unexposed area, between the adjacent exposed areas on the photoreceptor surface being rotated tends to remain electrostatically charged and, therefore, complete removal or extinguishment of the unnecessary electrostatic charge on the unexposed area cannot be achieved.

SUMMARY OF THE INVENTION

Accordingly, the present invention has for its object to provide an improved discharging device for use in an electrophotographic copying machine, which is reliable in operation in terms of complete removal of the unnecessary electrostatic charge on the photoreceptor surface, with substantial elimination of the disadvantages and inconveniences inherent in the conventional discharging devices.

Another important object of the present invention is to provide an improved discharging device of the type referred to above, which has a simple arrangement and construction and which does not require a relatively large space for installation thereof within the copying machine housing.

A further object of the present invention is to provide an improved discharging device of the type referred to above, which is constructed with minimum number of operating parts and which does not, therefore, require a change in design and, particularly, once-established positional relationship among the various operating elements of the copying machine which are arranged around the photoreceptor surface.

A still further object of the present invention is to provide an improved discharging device of the type referred to above, which can be employed in an electrophotographic copying machine having either a slit exposure system or a full frame exposure system.

A still further object of the present invention is to provide an improved discharging device of the type referred to above, which can be manufactured at a relatively low cost and does not unreasonably incur an increase of the manufacturing cost of the copying machine.

These objects of the present invention can be accomplished by providing a discharging device which comprises a source of discharging light, at least one elongated light guide for transmitting rays of light from the light source towards the photoreceptor surface, and a light intercepting mechanism interposed between the light source and the light guide, which light intercepting mechanism is, during the interval between portions of the photoreceptor surface successively passing through the exposure or imaging station, operated to permit the light rays from the light source to project through the light guide onto the photoreceptor surface to thereby extinguish or dissipate the unnecessary electrostatic charge on the consecutive portion thereof between the areas to be subsequently exposed.

The light source comprises, in preferred embodiments hereinafter described, an electric light bulb. Alternatively, the conventionally used erasing lamp may be used for the discharging light source.

The light guide comprises a bundle of optical fibers having one end situated adjacent the light source with the light intercepting mechanism interposed between it and said light source, and the other end situated in the vicinity of the photoreceptor surface between the exposure or imaging station and the charging station. Material for the optical fibers which can be employed in the present invention for the light guide may be glass, polystyrene resin, methyl methacrylate resin or any other resinous material having such an optical property as to transmit rays of light therethrough. Preferably, the use of the synthetic resin, such as methyl methacrylate resin, as the material for the optical fibers is recommended for the reason that the resultant light guide is inexpensive, is relatively highly flexible even when each optical fiber for the light guide is manufactured approximately 2 mm. in diameter, and will not lose its flexibility when cooled to a relatively low temperature.

If two light guides are employed, the conventionally employed erasing lamp may not be necessary.

The light intercepting mechanism comprises, where the present invention is to be applied to an electrophotographic copying machine having the full frame exposure system wherein no slit is provided and a flash of light is used to illuminate the original or document to be copied, a rotatably supported shutter operatively coupled to a drive unit, for example, an electric motor or solenoid. Where the present invention is to be applied to an electrophotographic copying machine having the slit exposure system, the light intercepting mechanism may comprise a pivotally supported shutter lever operatively coupled to a reciprocally movable transparent support structure for support of the original or document thereon, an illumination device reciprocally movably supported within the machine housing and beneath a stationary transparent support structure for support of the original or document thereon, or a drive mechanism for moving the illumination device.

BRIEF DESCRIPTION OF THE DRAWING

These and other objects and features of the present invention will become apparent from the following description taken in conjunction with preferred embodiments thereof with reference to the accompanying drawings, in which.

DESCRIPTION OF THE PREFERRED EMBODIMENTS

Figure 1:
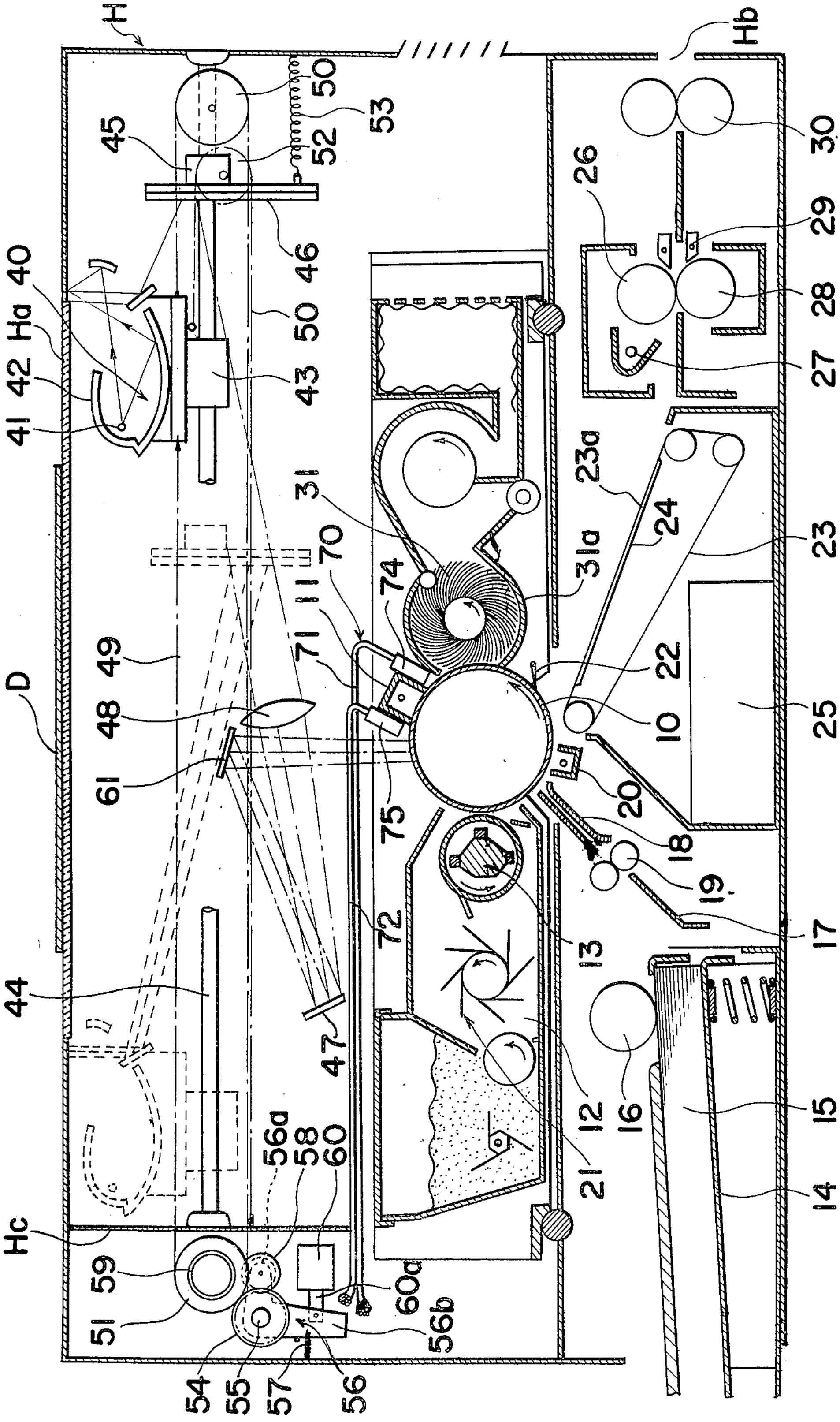
FIG. 1 is a schematic longitudinal sectional view of an electrophotographic copying machine having the slit exposure system, embodying the present invention.

Before the description of the present invention proceeds, it should be noted that like parts are designated by like reference numerals throughout the accompanying drawings.

In FIG. 1, there is shown an electrophotographic copying machine comprising a housing structure substantially divided into upper and lower compartments; the upper compartment accommodating therein an optical system while the lower compartment accommodates therein an electrophotographic processing system. The housing structure is generally designated by H and has a transparent support Ha stationary mounted on the top of the housing structure H, which transparent support H*a* is made of, for example, a transparent glass plate, and is adapted to support the original or document D to be copied thereon. While the optical system will be described in detail later, the processing system will now be described.

The electrophotographic processing system and the method performed thereby are well known to those skilled in the art and, therefore, the various operating elements thereof will be described in terms of their functions.

The electrophotographic copying system comprises a photoreceptor surface, generally indicated by 10, including a photoconductive layer or light receiving layer on a conductive backing and formed in the shape of a drum, which is mounted on a shaft (not shown) journaled in a machine frame to rotate in the direction indicated by the arrow to cause the drum surface sequentially to pass a plurality of processing stations including charging, exposure or imaging, developing, transfer, cleaning and erasing stations.

The charging station includes a corona charger 11 which applies a uniform electrostatic charge on the photoreceptor surface 10. Positioned next and adjacent to the charging station with respect to the direction of rotation of the photoreceptor surface 10 is the exposure or imaging station at which rays of light carrying an image of the original D to be copied, which have been transmitted from the transparent support H*a* through the optical system, as will be described later, via an exposure slit (not shown) in the form of a ribbon of light, is projected onto the photoreceptor surface 10 to dissipate the electrostatic charge in the exposed area thereof thereby forming a latent electrostatic image of the original to be copied.

The exposed area on the photoreceptor surface 10 is, as the latter is rotated, subsequently transferred to the developing station at which developing toner particles, which have been transported towards the photoreceptor surface 10 by magnetizable carrier beads mixed with the toner particles within a developer tank 12 and which have an electrostatic charge opposite to that of the latent image, are applied by means of magnetic brush bristles developed around an applicator drum 13, or otherwise cascaded in any known manner, over the photoreceptor surface 10. Since the developer disposed at the developing station may be of any known construction, the details thereof will not be described for the sake of brevity.

Between the developing station and the transfer station, there is provided a paper feeding station including a sheet feeding mechanism adapted to feed sheets of recording medium, for example, paper, successively to the photoreceptor surface 10 in coordination with the presentation of the developed image at said paper feeding station. This sheet feeding mechanism comprises a sheet supply tray 14 accommodating therein a stack of sheets of paper 15 which are fed one at a time by a feed roll 16 onto a feed passage defined by pairs of spaced guides 17 and 18. The sheet feed mechanism further comprises a pair of juxtaposed conveyor rolls 19 positioned between the pairs of guides 17 and 18 and adapted to be driven in association with the photoreceptor surface 10 so as to direct each sheet into contact with the rotating photoreceptor surface 10 at a point immediately preceding the transfer station.

At the transfer station, there is provided a corona discharger 20 for effecting transfer of the developed image from the photoreceptor surface 10 to the sheet in any known manner.

The sheet of paper, that has been transferred with the powder image from the photoreceptor surface 10 at the transfer station, is thereafter removed from the photoreceptor surface 10 by a pick-off mechanism 22 onto a conveyor belt 23 being driven in one direction such that the picked, developed sheet can be transported towards a fixing station as will subsequently be described. It is to be noted that that portion 23*a* of the conveyor belt 23, which is moving in a direction away from the photoreceptor surface 10 towards the fixing station, is backed up by a suction plate 24 connected to a source of vacuum 25 for supporting the developed sheet flat against the conveyor belt surface during transportation thereof from the photoreceptor surface 10 towards the fixing station.

The fixing station includes a heat applying roll 26 positioned adjacent a heater 27 so as to be heated by said heater 27, and a back-up roll 28 positioned below said heat applying roll 26. The heater 27 may comprise an electric infrared lamp and it will readily be seen that, as the developed sheet passes between the heat applying roll 26 and the back-up roll 28, the powder image on one surface of the developed sheet can permanently be fixed in a known manner. The fixed sheet is then picked off the rolls 26 and 28 by pick-off elements 29 and fed onto a pair of juxtaposed ejecting rolls 30 from which the same fixed sheet is ejected outside the copying machine housing H through an exit H*b* formed in said machine housing H.

The photoreceptor surface 10, from which the developed and transferred sheet has been separated at the pickup station, is subsequently transferred during continued rotation thereof to the cleaning station. The cleaning station is represented by a cleaner unit, generally indicated by 31, which cleaner unit 31 may be of any known construction and, therefore, the details thereof are herein omitted. However, it is to be noted that the cleaner unit 31 acts to remove the residual toner particles from the photoreceptor surface 10 in readiness for the subsequent cycle of the copying operation. For this purpose, the cleaner unit 31 is generally located preceding the charging station which has already been described.

The optical system of the electrophotographic copying machine, which is substantially accommodated within the upper compartment of the machine housing H, comprises an illumination device of any known construction, generally indicated by 40, which illumination device 40 includes a source of light 41 and a reflective mirror arrangement 42 designed such that rays of light emitted from the light source 41 can be projected towards the original D on the transparent support H*a* in the shape of a ribbon of light to illuminate said original D over the entire width thereof. This illumination device 40 is rigidly mounted on a gantry 43 reciprocally movably mounted on at least one pair of spaced guide rails 44, only one of which is shown, which guide rails 44 are supported in position within the machine housing H and extend in substantially parallel relation to the plane of the transparent structure Ha.

Reciprocally movably mounted on the same guide rails 44 is a mirror carriage 45 having a reflective mirror 46 rigidly mounted thereon for reflecting the ribbon of light from the original D on the transparent support H*a* towards a fixed reflective mirror 47 through a lens assembly 48, said mirror 47 and said lens assembly 48 being rigidly supported in position to the machine frame (not shown).

As is well understood by those skilled in the art, when the gantry 43 carrying the illumination device 40 thereof is moved from a rest position, as indicated by the full lines, to a scanned position as indicated by the broken lines while the ribbon of light from the illumination device 40 scans the original D on the transparent support D, the carriage 45 carrying the reflective mirror 46 thereon moves in pursuit of the gantry 43 at a speed half the speed of movement of the gantry 43.

For effecting the movement of the gantry 43 and carriage 45, a common drive mechansim is provided, which drive mechanism comprises a first cable 49 having both ends secured to the gantry 43 in opposed relation to each other, a substantially intermediate portion of said cable 49 being suspended around first and second pulleys 50 and 51 which are respectively rotatably supported in position adjacent the opposite ends of one of the guide rails 44, whereby rotation of the pulley 51, effected in a manner as will be described later, causes the gantry 43 and, hence, the illumination device 40 to move from the rest position towards the scanned position. A second cable 50 having one end rigidly secured to the gantry 43 extends around an idle wheel 52, rotatably carried by the carriage 45, and terminates at a partition walk Hc adjacent the pulley 51. The second cable 50 is held under tension by a tension spring 53 acting to bias the carriage 45 towards the pulley 50, which tension spring 53 also acts to return the gantry 43 and the carriage 45 to the original position upon arrival of the gantry 43 at the scanned position as will be described in more detail.

The drive mechanism further comprises a drive gear 54 operatively coupled to an electrical motor (not shown), which may be the same as used to rotate the photoreceptor surface 10, in any known manner, for example, by means of a train of gears or a belt system, which gear 54 is rotatably mounted on a shaft 55 journaled to the machine frame. A substantially L-shaped plate lever 56 having a carrier arm **56*a* and an intercepting arm 56*b* is pivotally mounted at a substantially intermediate portion thereof on the shaft 55 for pivotal movement between engaged and disengaged positions and is normally biased to the disengaged position by means of a biasing spring 57, for example, a tension spring. The carrier arm 56*a* of the plate lever 56 carries an intermediate transmission gear 58 which is, when said plate lever 56 is pivoted about the shaft 55 to the engaged position against the biasing spring 57, engageable both with the drive gear 54 and a geared wheel 59, which geared wheel 59 is supported in coaxial relation to the pulley 51 for rotation together therewith, or otherwise is integrally formed with said pulley 51. When the intermediate transmission gear 58 is engaged both with the drive gear 54 and the geared wheel 59, rotation of the gear 54 can be transmitted to the geared wheel 59 through sid intermediate transmission gear 58 so that the gantry 43 and the carriage 45** are moved in the manner as hereinbefore described.

For selectively moving the plate lever 56 between the engaged and disengaged positions, a solenoid 60 having a solenoid armature **60*a* is provided, which solenoid armature 60*a* is pivotally connected to the plate lever 56 adjacent the intercepting arm 56*b*. The solenoid 60 may be electrically coupled to an electric switch (not shown) which is closed upon depression of a start button (not shown) to complete an electric circuit (not shown) necessary to start the copying operation. The solenoid armature 60*a* of the solenoid 60 is movable between projected and retracted positions and is normally held in the projected position, so long as said solenoid is not energized with the switch opened, by the action of the spring element 57 acting on said solenoid armature 60*a* via the pivotal connection between the plate lever 56 and said armature 60*a*.**

During the scanning operation of the illumination device 40 moving from the rest position towards the scanned position, the ribbon of light carrying a consecutive image of the original D on the transparent support H*a* travels in a manner as indicated by the chain lines and is projected on the mirror 47 as described above. The ribbon of light thus projected on the mirror 47 is reflected thereby towards the photoreceptor surface 10 through the exposure slit (not shown) after having been further reflected by another stationary mirror 61, so that the latent electrostatic image can be formed on the photoreceptor surface 10.

The solenoid 60 is adapted to be deenergized in response to the arrival of the illumination device 40 at the scanned position so that the intermediate transmission gear 58 can be disengaged at least from the geared wheel 59 to permit the illumination device 40 to return to the rest position by the action of the tension spring 53 together with the mirror carriage 45. To this end, the switch which has been described as closed by the depression of the start button may be of a type which can be opened in response to the arrival of the illumination device at the scanned position.

In the foregoing description, one form of electrophotographic copying machine to which the present invention can be applicable has been outlined for illustrative purposes. However, the erasing station, generally represented by an erasing lamp for extinguishing the residual electrostatic charge on the photoreceptor surface in readiness for the subsequent charging, which erasing lamp is conventionally disposed either preceding or next adjacent to the cleaning station, has not yet been described. This is because, in the illustrated copying machine, the discharging device according to the present invention is, as will subsequently be described, designed so as to concurrently act as the erasing lamp.

Figure 2:
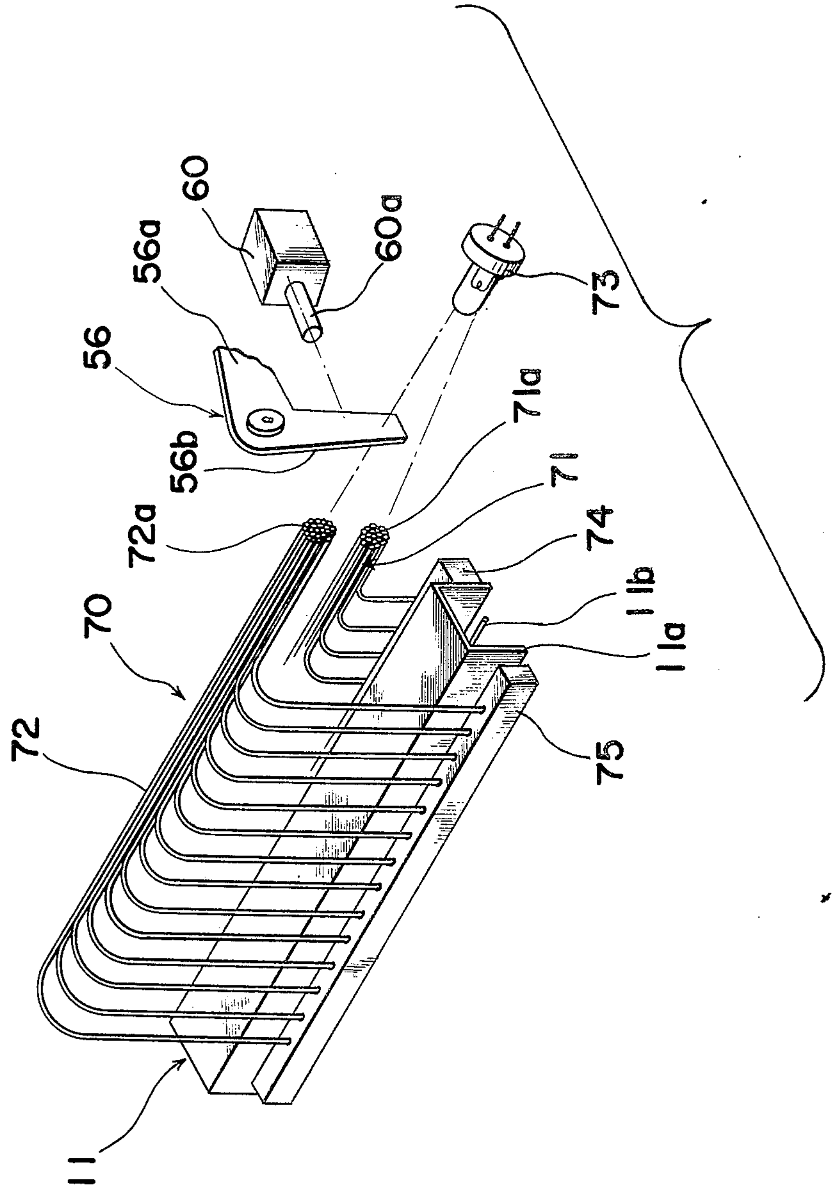
FIG. 2 is a schematic perspective view of a discharging device according to one embodiment of the present invention, which discharging device is employed in the copying machine shown in FIG. 1.

Referring now to FIGS. 1 and 2, the discharging device is generally indicated by 70 and comprises first and second elongated light guides 71 and 72 and a common source of light 73. Each of the light guides 71 and 72 is, as best shown in FIG. 2, formed by a plurality of optical fibers 71*a* or 72*a*, made of the material which has been described above.

The light guide 71 has one end situated adjacent the light source 73 and the other end connected to an elongated, substantially U-shaped cross-section shielding case 74 in a manner as will be described in more detail. The shielding case 74 extends over the entire width of the photoreceptor surface 10 and is supported in position close to the photoreceptor surface 10 between the corona charger 11 and the cleaner unit 31. More specifically, the shielding case 74 has the shape of an open bottom, elongated cubic body and is arranged in the vicinity of the photoreceptor surface 10 with the rectangular bottom opening facing towards said photoreceptor surface 10.

The connection between the second mentioned end of the light guide 71 and the shielding case 74 is such that respective ends of the optical fibers 71*a*, which altogether form said second mentioned end of said light guide 71, are inserted through a top wall portion of the case 74 in equally spaced relation to each other in the widthwise direction of said shielding case 74, the remaining portions of said optical fibers 71*a* being formed into a bundled configuration. Preferably, the whole interior surface of the shielding case 74 is made reflective by, for example, applying or otherwise vaporbonding a foil of aluminum material thereto.

The other light guide 72 has one end situated adjacent the light source 73 with the intercepting arm 56*b* of the plate lever 56 interposed between said one end of said light guide 72 and said light source 73, and the other end connected to an elongated, substantially U-shaped cross-section shielding case 75 of the substantially same construction as the shielding case 74, which shielding case 75 is supported in position close to the photoreceptor surface 10 between the corona charger 11 and the developer unit 21 and, more particularly, at a point immediately followed by the charger 11 with respect to the direction of rotation of the photoreceptor surface 10.

Connection between the light guide 72 and the shielding case 75 is such that respective ends of the optical fibers 72*a*, which altogether form said second mentioned end of said light guide 72, are inserted through a top wall portion of the case 75 in equally spaced relation to each other in the widthwise direction of said shielding case 75, the remaining portions of said optical fibers 72*a* being formed into a bundled configuration.

One way of supporting the shielding cases 74 and 75 in position close to the photoreceptor surface 10 is, as best shown in FIG. 2, to secure the shielding cases 74 and 75 to respective side walls of a substantially U-shaped cross-section casing 11*a* which forms a part of the charger 11 and straddles a corona discharge electrode 11*b*. Alternatively, if the shielding case 75 is secured to the casing 11*a*, the shielding case 74 may be secured to either side of a housing 31*a* forming a part of the cleaner unit 31.

It is to be noted that the light source 73 is constantly energized during each copying operation.

From the foregoing description, it is clear that, only when the plate lever 56 is pivoted to the engaged position upon energization of the solenoid 60, the intercepting arm 56*b* is brought into position to intercept passage of the light from the light source 73 towards the light guide 72 and a consecutive portion of the photoreceptor surface 10 being rotated is, at this time, exposed to the incoming light carrying the correspondingly consecutive image of the original to be copied. It is to be noted that, prior to the actual exposure taking place and after the lever 56 has been pivoted to the engaged position, the light from the light source 73 travels through the light guide 71 and is in turn projected onto the photoreceptor surface 10 through the shielding case 74 thereby extinguishing the residual electrostatic charge on the photoreceptor surface 10 in readiness for the next exposure.

It is also clear that, when the plate lever 56 is returned to the original, disengaged position upon deenergization of the solenoid 60, the intercepting arm 56*b* of the plate lever 56 moves clear of the path of light from the light source 73 towards the light guide 72 so that the light from the light source 73 can be projected through the shielding case 75 onto the photoreceptor surface thereby extinguishing the unnecessary electrostatic charge, which is a portion of the electrostatic charge formed by the charger 11 in readiness for the next exposure and which is formed on the photoreceptor surface 10 at a position between the area thereof which has already been exposed and the next adjacent area which is to be subsequently exposed.

Where the conventionally used erasing lamp is utilized, the light guide 71 together with the shielding case 74 is not necessary.

Figure 3:
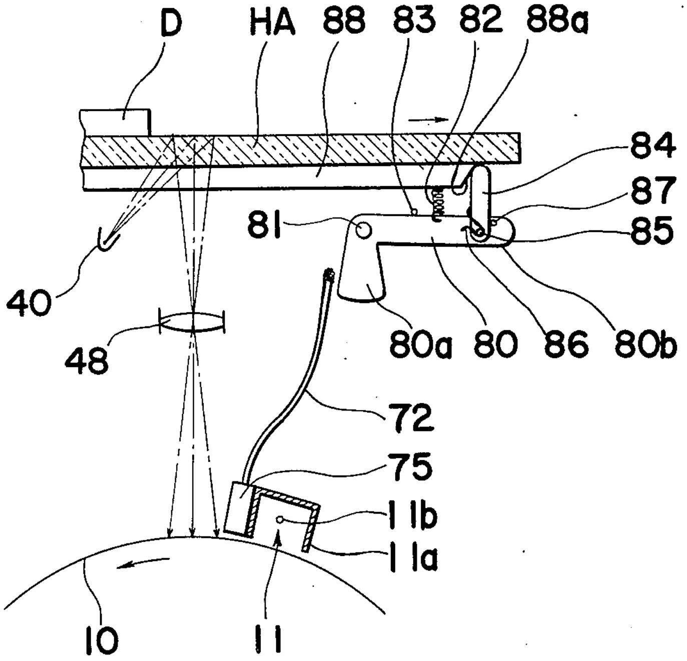
FIG. 3 schematically illustrates the discharging device according to another embodiment of the present invention with a pivotally supported shutter in one position.
Figure 4:
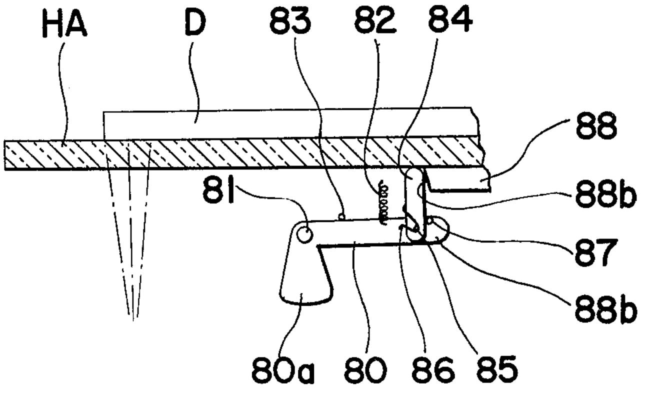
FIG. 4 schematically illustrates a portion of the discharging device of FIG. 3 with the shutter in another position.

Application of the discharging device of the present invention to a copying machine of the full frame exposure system type wherein the transparent support, which has been shown at Ha and described as held in a stationary position by the machine housing H in the foregoing embodiment, is supported for reciprocal movement between rest and scanned positions while the illumination device, which has been shown by 40 and described as reciprocally movably supported for movement between the rest and scanned positions, is stationary supported in position within the machine housing H, will now be described with particular reference to FIGS. 3 and 4.

In FIGS. 3 and 4, the reciprocally movably supported transparent and the stationarily supported illumination device are respectively designated by HA and 40'.

Although the discharging device, which may be employed in the copying machine of the type shown in FIGS. 3 and 4, may be identical with that shown in FIGS. 1 and 2, a discharging device which does not include the light guide 71 and its associated shielding case 74 is illustrated in FIGS. 3 and 4.

As is well known to those skilled in the art, the reciprocally supported transparent support HA is movable from the rest position towards the scanned position in the direction indicated by the arrow at the same speed as the peripheral velocity of the photoreceptor surface 10. For effecting the movement of the transparent support HA, a similar mechanism shown in FIG. 1 may be employed. By way of example, the opposite ends of the cable 44, which have been described as connected to the gantry 43, may be connected to the transparent support HA and, for effecting the return movement of the transparent support HA from the scanned position towards the rest position, the spring element 53, which has been described as used to return the illumination device 40 to the original position, may be interposed between a wall portion of the machine housing H and the transparent support HA.

The discharging device in the embodiment of FIGS. 3 and 4 includes a substantially L-shaped shutter plate 80 having an intercepting arm 80*a* and an operating arm 80*b*, a substantially intermediate portion of which plate 80 is mounted on a shaft 81, journalled to the machine frame, for pivotal movement between operative and inoperative positions and is normally biased to the inoperative position by the action of a spring element 82, for example, a tension spring, disposed between the operating arm 80*b* and the machine frame. It is to be noted that the inoperative position of the shutter plate 80 is defined by a stop pin 83 secured to the machine frame.

The operating arm 80*b* of the shutter plate 80 has mounted thereon an escapement lever 84 having one end pivotally connected to said operating arm 80*b* by means of a connecting pin 85. This escapement lever 84 is biased clockwise about the pin 85 by a wire spring 86, engaging to a stop pin 87 so that said escapement lever 84 substantially stands upright with the other end thereof terminating adjacent and below a rigid frame (not shown) for supporting the transparent support HA.

The rigid frame for the support of the transparent support HA has rigidly mounted on its under surface an elongated bar 88 having both ends sloped as shown by 88*a* and 88*b* for sliding engagement with the tip of the escapement lever 84.

Preferably, the interrupting arm 80*a* has a segmental shape and is so sized that entrance of the dispersed rays of light from the light source 73 (FIG. 2) into the light guide 72 can be prevented when the shutter plate is pivoted to the operated position against the spring element 82 with said interrupting arm 80*a* exactly positioned between said light source 73 and said light guide 72.

In the construction so far described, it is clear that, as the transparent support HA starts to move from the rest position to the scanned position, the elongated bar 88 moving together with said transparent support HA causes the shutter lever 80 to pivot from the inoperative position to the operated position with the sloped end 88*a* thereof engaging the tip of the escapement lever 84. More specifically, during continued movement of the transparent support HA from the rest position towards the scanned position, the tip of the escapement lever 84 relatively slides over the sloped end 88*a* of the elongated bar 88 moving downwards so that the shutter plate 80 is pivoted about the shaft 81 against the spring element 82. Upon completion of the pivotal movement of the shutter plate 80 from the inoperative position to the operated position, the intercepting arm 80*a* of the shutter plate 80 is brought in position to intercept passage of light from the light source 73 towards the light guide 72.

At the time of completion of the movement of the transparent support HA, that is, upon arrival of the transparent support HA at the scanned position, the tip of the escapement lever 84 relatively slides down the sloped end 88*b* of the elongated bar 88 being biased by the spring element 82, as shown in FIG. 4, so that the shutter plate 88 is returned to the original, inoperative position about the shaft 81 by the action of said spring element 82 with the intercepting arm 80*a* thereof moving out of the path of light from the light source 73 towards the light guide 72.

The mechanism for operating the shutter plate 80 in the manner as hereinbefore described is designed such that the intercepting arm 80*a* of the shutter plate 80 can be brought into position to intercept passage of the light from the light source towards the light guide 72 in coordination with presentation of the front of the electrostatic charge, formed by the corona charger 11 on the photoreceptor surface 10 being rotated, at a point immediately below the exposure slit (not shown) through which the image of the original D is projected onto said photoreceptor surface 10, and can be brought into position to permit the passage of the light from the light source towards the light guide 72 and, hence, towards the photoreceptor surface 10 through the shielding case 75, upon arrival of the transparent support HA at the scanned position.

If the length of the elongated bar 88 is made adjustable to accommodate the varying length of the original D to be copied, for example, if the position of the sloped end 88*b* can adjustably be moved selectively toward to and away from the sloped end 88*a* depending upon the length of the original D to be copied, it is possible to intercept the passage of light from the light source 73 towards the light guide 72 upon completion of scan of the ribbon of light over the entire length of the original, not necessarily upon arrival of the transparent support HA at the scanned position.

During the return movement of the transparent support HA from the scanned position towards the rest position, the tip of the escapement lever 84 tends to engage the sloped end 88*b* of the elongated bar 88 moving together with the transparent support HA. However, since the wire spring 86 is selected so as to be circumferentially inwardly compressive when a slight force is applied thereto, the engagement of the sloped end 88*b* with the tip of the escapement lever 84 causes the latter to pivot about the connecting pin 85 against said wire spring 86 without pivoting the shutter plate 86 from the inoperative position towards the operated position about the shaft 85. Accordingly, before the next copying operation commences, the light from the light source 73 is projected through the light guide 72 onto the photoreceptor surface 10 to extinguish the unnecessary electrostatic charge.

Figure 5:
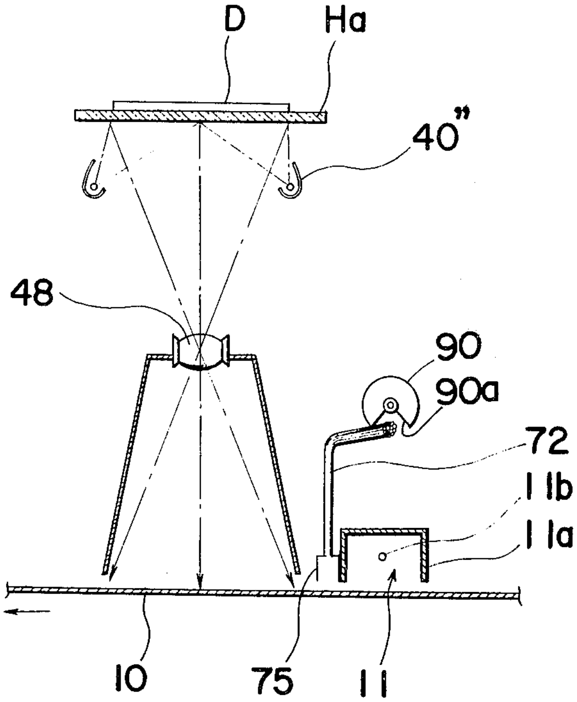
FIG. 5 schematically illustrates the discharging device according to a further embodiment of the present invention, which discharging device is shown as applied to an electrophotograhic copying machine having the full frame exposure system.
Figure 6:
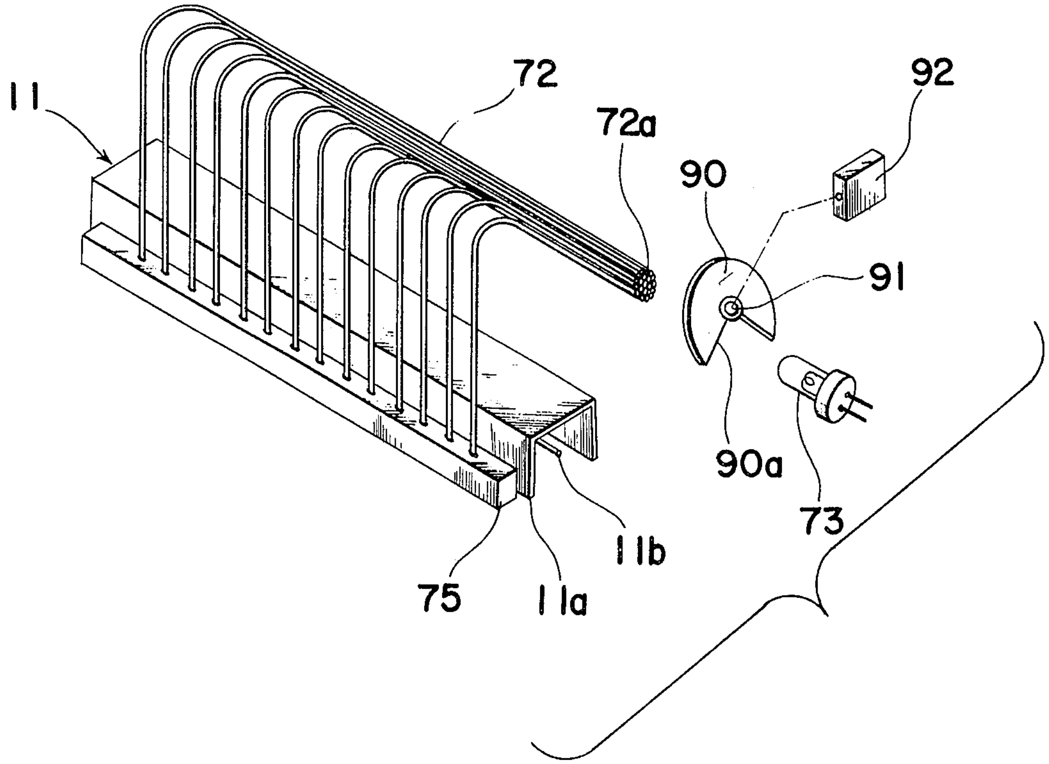
FIG. 6 is a schematic perspective view of the discharging device shown in FIG. 5.

FIGS. 5 and 6 illustrate an application of the discharging device of the present invention to the electrophotographic copying machine of the full frame exposure system type wherein the illumination device 40" comprises one or two flash lamps which, when energized, instantaneously illuminate the original to be copied. The photoreceptor surface used in the copying machine of this type is formed in the shape of an endless belt which is intermittently driven in one direction, the intermittent of movement of the belt-shaped photoreceptor surface being effected during each exposure.

The discharging device utilizable in the copying machine of the type shown in FIG. 5 is substantially identical to that shown in FIGS. 3 and 4 except for the pivotally supported shutter plate 80 and the operating mechanism therefor of FIGS. 3 and 4 are replaced by a rotatably supported disc 90 and an operating mechanism quite different from that shown in FIGS. 3 and 4.

The rotatably supported disc 90 has a segment-shaped cut-out portion 90*a* formed therein and is supported for rotation about a mounting spindle. For rotating the disc in such a manner that the segment-shaped cut-out portion 90*a* of said disc 90 can selectively be brought into position to permit passage of the light from the light source 73 towards the light guide 72 therethrough and to intercept the passage thereof, any suitable operating mechanism 92, for example, an electrically operated motor or an electric solenoid actuator, may be employed.

Where an electrically operated motor is employed for the operating mechanism, the operative connection between the disc 90 and the motor may be made either by a gear system or a belt system. On the other hand, where an electric solenoid is employed for the operating mechanism, the operative connection between said disc 90 and the solenoid actuator may be made by means of a mechanical linkage.

Preferably, the disc 90 is rotatable by the operating mechanism through a certain angle of rotation about the spindle 90 between an inoperative position, in which condition the passage of light from the light source 73 towards the light guide 72 is intercepted, and an operative position in which condition the passage thereof towards the light guide 72 is permitted through the segment-shaped cut-out portion 90*a*.

The operating mechanism 92 may be electrically connected to a circuit for controlling the lamps 40″ or mechanically connected to a cam assembly, which is rotated in association with the copying operation, so that operation of said operating mechanism 92 can be controlled thereby.

In the construction shown in FIGS. 5 and 6, it has been found that 12 to 25 optical fibers are sufficient to constitute the light guide 72 where the belt-shaped photoreceptor surface 10 has a width of 25 cm. and is spaced about 1 to 2 cm. from the light emitting end of the light guide 72 ajacent said photoreceptor surface. Moreover, it has been found that the light guide 72 made up of the 12 to 15 optical fibers, 0.5 mm. in diameter, has a bundle portion having an outer diameter not more than 5 cm. at the maximum. Therefore, it is clear that the discharging device can be manufactured in a relatively compact size.

Although the present invention has been fully described in conjunction with the various preferred embodiments thereof, it should be noted that numerous changes and modifications will be apparent to those skilled in the art. For example, a conventionally employed erasing lamp may be utilized in place of the light source 73, in which case a bundle of optical fibers, similar in construction to either of the light guides 71 and 72, would be used to transmit rays of light from the erasing lamp towards one or both of the light guides 71 and 72.

Accordingly, such changes and modifications are to be construed as included within the true scope of the present invention unless they depart therefrom.

What is claimed is:

1. In an electrophotographic copying machine which comprises a transparent support for support thereon of the original to be copied on a recording medium, said transparent support being reciprocally movably supported for movement between rest and scanned positions, an illumination device for illuminating the original on said transparent support, and an optical image projecting system for transmitting rays of light, which carry an image of the original thus illuminated towards a photoreceptor surface to form an electrostatic latent image thereon, an apparatus for extinguishing unnecessary electrostatic charge formed on the photoreceptor surface by means of an electrostatic charger at an area between each two adjacent areas to be optically exposed to the incoming light, which apparatus comprises:

a source of discharging light;

an elongated light guide for transmitting said discharging light towards said photoreceptor surface therethrough to extinguish said unnecessary electrostatic charge, said light guide having one end situated adjacent said discharging light source in position to receive the discharging light therefrom and the other end situated in the vicinity of said photoreceptor surface; and intercepting means positioned between said discharging light source and said one end of said light guide for intercepting the transmission of said discharging light from said discharging light source towards said photoreceptor surface for a length of time corresponding to the length of the original to be copied, said intercepting means comprising an elongated actuating member supported for movement together with said transparent support and extending in parallel relation to the direction of movement of said transparent support, a pivotable plate lever supported for pivotal movement between inoperative and operated positions and normally biased to said inoperative position, said plate lever having one end adapted to be brought in position to intercept said transmission of said discharge light towards said light guide when said plate lever is pivoted to said operated position, and operating member having one end pivotally connected to the other end of said plate lever and the other end held in position in the path of travel of said elongated actuating member, said other end of said operating member being enageable with said actuating member to pivot said plate lever from said inoperative position towards said operated position immediately after the start of movement of said transparent support from said rest position towards said scanned position.

2. In an electrophotographic copying machine which comprises a transparent support for support thereon of the original to be copied on a recording medium, an illumination device for illuminating the original on said transparent support, means for moving said illumination device between rest and scanned positions to cause said illumination device to consecutively illuminate the original on the transparent support, and which includes a pivotally supported plate lever movable between engaged and disengaged positions and normally biased to the disengaged position and an actuating mechanism for, when operated, moving said pivotally supported plate lever towards said engaged position to cause said illumination device to move from said rest position towards said scanned position, and an optical image projecting system for transmitting rays of light which carry an image of the original thus illuminated towards a photoreceptor surface to form an electrostatic latent image thereon, an apparatus for extinguishing unnecessary electrostatic charge formed on the photoreceptor surface by means of an electrostatic charger at an area between each two adjacent areas to be optically exposed to the incoming light, which apparatus comprises:

a source of discharging light;

an elongated light guide for transmitting said discharging light towards said photoreceptor surface therethrough to extinguish said unnecessary electrostatic charge, said light guide having one end situated adjacent said discharging light source in position to receive the discharging light therefrom and the other end situated in the vicinity of said photoreceptor surface; and intercepting means positioned between said discharging light source and said one end of said light guide for intercepting the transmission of said discharging light from said discharging light source towards said photoreceptor surface for a length of time corresponding to the length of the original to be copied, said intercepting means being consitituted by a portion of said pivotally supported plate lever, which, when said plate lever is pivoted to said engaged position by said actuating mechanism, is brought into position to intercept said transmission of said discharging light from said discharging light source towards said light guide.

3. In an electrophotographic copying machine which comprises an illumination device for illuminating an original, an optical image projecting system for transmitting rays of light which carry an image of the original thus illuminated towards an exposing station of a photoreceptor surface to form an electrostatic latent image thereon, an electrostatic charger for charging the photoreceptor surface, and a developing means for developing the electrostatic latent image, an apparatus for erasing unnecessary electrostatic charger formed on the photoreceptor surface by said electrostatic charger at an area between said electrostatic charger and said exposing station through which the photoreceptor surface passes, said apparatus comprising:

a source of discharging light;

a plurality of elongated optical fiber means for transmitting said discharging light onto said photoreceptor surface, said optical fiber means having the one ends arranged in a row extending substantially across the width of the photoreceptor surface adjacent said electrostatic charger and close to said photoreceptor surface and the other ends bundled together adjacent said discharging light source;

intercepting means positioned between said discharging light source and said other ends of said optical fiber means, said intercepting means being movable between a first position in which said intercepting means is out of the light path of said discharging light source and a second position in which said intercepting means is in the light path of said discharging light source;

control means coupled to said intercepting means for moving said intercepting means to said first position for erasing unnecessary charges on the photoreceptor surface and to said second position for intercepting the transmission of said discharging light from said discharging light source for a length of time corresponding to the length of the original to be copies.

4. An apparatus as claimed in claim 3 further comprising a light shielding case of substantially u-shape cross-section in which said one ends of optical fiber means are enclosed, said light shielding case having a substantially rectangular opening which faces said photoreceptor surface.

5. An apparatus as claimed in claim 4 wherein said light shielding case is secured to said electrostatic charger.

6. An apparatus as claimed in claim 4 wherein the interior surface of said light shielding case is reflective.

7. An apparatus as claimed in claim 3 wherein said electrophotographic copying machine includes a transparent support for supporting thereon the original to be copied, said transparent support being reciprocally movably supported for movement between rest and scanned positions, said control means being operably associated with said transparent support for moving said intercepting means to intercept said transmission of said discharging light in response to start of movement of said transparent support from said rest position towards said scanned position.

8. An apparatus as claimed in claim 7 wherein said control means comprises a lever means supported for movement between the inoperative and operated positions and normally biased to said inoperative position, said lever means having one end thereon constituting said intercepting means adapted to be brought in position to intercept said transmission of said discharging light towards said other end of said optical fiber when said lever means is moved to said operated position, and an actuating member movable in accordance with the movement of said transparent support, said lever means having another end in the path of travel of said elongated actuating member, said another end of said lever means being engageable with said actuating member to move said lever means from said inoperative position towards said operated position immediately after the start of movement of said transparent support means said rest position towards said scanned position.

9. An apparatus as claimed in claim 3 wherein said electrophotographic copying machine includes moving means for moving said illumination device between rest and scanned positions to cause said illumination device to consecutively illuminate the original, and wherein said control means is operably associated with said moving means for moving said intercepting means to intercept said transmission of said discharging light in response to start of movement of said illumination device from said rest position towards said scanned position.

10. An apparatus as claimed in claim 9 wherein said control means includes a lever means movable between engaged and disengaged positions and normally biased to the disengaged position brought into position to intercept said transmission of said discharging light from said discharging light source towards said other ends of said optical fiber, and an actuating mechanism coupled to said lever means for moving said lever means towards said engaged position in response to the start of movement of said illumination device from said rest position toward said scanned position.

* * * * *